United States Patent
Huo

(10) Patent No.: US 9,748,719 B2
(45) Date of Patent: Aug. 29, 2017

(54) BATTERY CONNECTOR AND CIRCUIT MODULE

(71) Applicant: Molex, LLC, Lisle, IL (US)

(72) Inventor: Wei-Jie Huo, Shanghai (CN)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/348,399

(22) Filed: Nov. 10, 2016

(65) Prior Publication Data

US 2017/0179662 A1    Jun. 22, 2017

(30) Foreign Application Priority Data

Dec. 22, 2015 (CN) .......................... 2015 2 1080788

(51) Int. Cl.

| | |
|---|---|
| *H01R 3/00* | (2006.01) |
| *H01R 33/18* | (2006.01) |
| *H01M 2/10* | (2006.01) |
| *H01M 2/20* | (2006.01) |
| *H01M 10/42* | (2006.01) |
| *H01M 10/48* | (2006.01) |
| *H01R 12/55* | (2011.01) |
| *H01R 13/24* | (2006.01) |
| *H01R 12/70* | (2011.01) |
| *H01R 12/71* | (2011.01) |
| *H01R 11/28* | (2006.01) |
| *H01R 13/641* | (2006.01) |

(52) U.S. Cl.
CPC .......... *H01R 33/18* (2013.01); *H01M 2/1038* (2013.01); *H01M 2/20* (2013.01); *H01M 10/425* (2013.01); *H01M 10/488* (2013.01); *H01R 12/55* (2013.01); *H01R 12/7076* (2013.01); *H01R 12/716* (2013.01); *H01R 13/24* (2013.01); *H01R 11/281* (2013.01); *H01R 13/641* (2013.01)

(58) Field of Classification Search
USPC ........................................ 439/488, 489, 500
See application file for complete search history.

(56) References Cited

U.S. PATENT DOCUMENTS

| | | | |
|---|---|---|---|
| 7,448,904 B2 * | 11/2008 | Darr .................... | H01M 2/1038 429/100 |
| 7,473,126 B1 | 1/2009 | Chen et al. | |
| 2014/0063708 A1 | 3/2014 | Liu | |

FOREIGN PATENT DOCUMENTS

| | | |
|---|---|---|
| CN | 101097998 A | 2/2008 |
| CN | 204349003 U | 5/2015 |

* cited by examiner

*Primary Examiner* — Tho D Ta
(74) *Attorney, Agent, or Firm* — James A. O'Malley

(57) ABSTRACT

A battery connector is provided which is used to electrically connect a button battery. The connector has an insulating housing and positive and negative terminals. The housing has a limiting space for receiving and fixing the battery. The positive terminal has a positive contact portion which extends into the space and a first tail portion which maintains an electrical connection with a circuit board. The negative terminal has a negative contact portion which extends into the space so as to contact a negative electrode on a bottom surface of the battery, a second tail portion which maintains an electrical connection with the board, and a connection portion which is brought to move by the negative contact portion so as to electrically connect with the board when the battery is received in the space. The battery connector can be provided as part of a circuit module having an indicating member.

15 Claims, 8 Drawing Sheets

BATTERY CONNECTOR AND CIRCUIT MODULE

RELATED APPLICATIONS

This application claims priority to Chinese Application No. 201521080788.8, filed Dec. 22, 2015, which is incorporated herein by reference in its entirety.

TECHNICAL FIELD

The present disclosure relates to a connector, and more specifically relates to a battery connector and a circuit module comprising the battery connector.

BACKGROUND ART

Generally, an electrical connector used for a button battery, such as disclosed in Chinese patent issued publication No. CN101097998A, usually cannot detect whether the button battery is mounted to reach a predetermined position or not. If the button battery starts to use when the button battery is not mounted to reach the predetermined position, the button battery will easily looses or detach from the electrical connector due to vibration, and in turn will lead to the phenomenon of poor electrical contact or electrical interruption.

SUMMARY

The present disclosure provides a battery connector which can cooperate with an indicating member mounted on the same circuit board to detect whether a button battery is mounted to reach a predetermined position or not.

The present disclosure further provides a circuit module which can detect whether the button battery is mounted to reach a predetermined position or not.

Accordingly, in some embodiments, a battery connector of the present disclosure is for being mounted on a circuit board to electrically connect a button battery, the circuit board is provided with a first conductive portion, a second conductive portion and a third conductive portion, and an indicating member is electrically connected between the first conductive portion and the third conductive portion. The battery connector comprises an insulating housing, a positive terminal and a negative terminal. The insulating housing comprises a bottom wall, a plurality of elastic side walls which respectively connect with the bottom wall and a plurality of protruding blocks, each protruding block protrudes from the corresponding elastic side wall at a position adjacent to the top of the corresponding elastic side wall, is spaced apart from the bottom wall and faces the bottom wall. The bottom wall, the plurality of elastic side walls and the plurality of protruding blocks cooperate with each other to define a limiting space for receiving and fixing the button battery. The positive terminal is fixed to the insulating housing, the positive terminal comprises a positive contact portion which extends into the limiting space so as to contact a positive electrode on a side surface of the button battery and a first tail portion which extends out of the insulating housing so as to maintain an electrical connection with the first conductive portion of the circuit board. The negative terminal is fixed to the insulating housing, the negative terminal comprises a negative contact portion which extends into the limiting space so as to contact a negative electrode on a bottom surface of the button battery, a second tail portion which extends out of the insulating housing so as to maintain an electrical connection with the second conductive portion of the circuit board and a connection portion which is brought to move by the negative contact portion so as to electrically connect with the third conductive portion when the button battery is received in the limiting space. The indicating member is electrified to generate an indication signal by that the connection portion electrically connects with the third conductive portion.

Thus, in some embodiments, a circuit module of the present disclosure comprises a circuit board, an indicating member and a battery connector. The circuit board is provided with a first conductive portion, a second conductive portion and a third conductive portion. The indicating member is electrically connected between the first conductive portion and the third conductive portion of the circuit board. The battery connector is mounted on the circuit board to electrically connect a button battery and comprises an insulating housing, a positive terminal and a negative terminal. The insulating housing comprises a bottom wall, a plurality of elastic side walls which respectively connect with the bottom wall and a plurality of protruding blocks, each protruding block protrudes from the corresponding elastic side wall at a position adjacent to the top of the corresponding elastic side wall, is spaced apart from the bottom wall and faces the bottom wall. The bottom wall, the plurality of elastic side walls and the plurality of protruding blocks cooperate with each other to define a limiting space for receiving and fixing the button battery. The positive terminal is fixed to the insulating housing, the positive terminal comprises a positive contact portion which extends into the limiting space so as to contact a positive electrode on a side surface of the button battery and a first tail portion which extends out of the insulating housing so as to maintain an electrical connection with the first conductive portion of the circuit board. The negative terminal is fixed to the insulating housing, the negative terminal comprises a negative contact portion which extends into the limiting space so as to contact a negative electrode on a bottom surface of the button battery, a second tail portion which extends out of the insulating housing so as to maintain an electrical connection with the second conductive portion of the circuit board and a connection portion which is brought to move by the negative contact portion so as to electrically connect with the third conductive portion when the button battery is received in the limiting space. The indicating member is electrified to generate an indication signal by that the connection portion electrically connects with the third conductive portion.

In some embodiments, when the button battery is received in the limiting space, a top surface of the button battery abuts against the plurality of protruding blocks and the connection portion contacts and electrically connects with the circuit board.

In some embodiments, the second tail portion and the connection portion of the negative terminal are positioned at two opposite ends respectively.

In some embodiments, the insulating housing further comprises two mounting portions which respectively connect with the bottom wall, are spaced apart from each other and face each other, and the positive terminal and the negative terminal are fixed on the two mounting portions respectively.

In some embodiments, the bottom wall of the insulating housing has a through groove which corresponds to the connection portion of the negative terminal in position for providing a space for the connection portion of the negative terminal to move and contact the third conductive portion of the circuit board so as to establish an electrical connection.

In some embodiments, the negative terminal further comprises a fixed portion which is provided on the corresponding mounting portion and an elastic arm which extends from an end of the fixed portion adjacent to the limiting space, the second tail portion extends from an end of the fixed portion outside the limiting space, the connection portion is formed at a distal end of the elastic arm and faces toward the through groove, the negative contact portion is formed on the elastic arm, is adjacent to the connection portion and faces toward the limiting space.

In some embodiments, the indicating member is a light emitting member.

In some embodiments, the indicating member is a screen display element.

In some embodiments, the indicating component electrically connects with the first conductive portion and the third conductive portion via two conductive wires respectively.

The present disclosure has at least has the following effects: when the button battery is received in the limiting space, the connection portion of the negative terminal electrically connects with the third conductive portion of the circuit board to electrify the indicating member and in turn the indicating member generates an indication signal, so that whether the button battery is mounted to reach the predetermined position or not can be detected and provided for a user for identification, so that it avoids the button battery not being mounted to reach the predetermined position to produce the risk of poor electrical contact or electrical interruption. And, when the button battery is received in the limiting space, the negative contact portion of the negative terminal can obtain support by that the connection portion abuts against the circuit board to make a normal force of the negative contact portion contacting the button battery increased, and in turn the contact stability can be maintained, that is, the button battery electrically connects with the negative terminal stably.

BRIEF DESCRIPTION OF THE DRAWINGS

Other characteristics and effects of the present disclosure will be apparent through detailed description of embodiments with referring to the Figures, and in which.

DETAILED DESCRIPTION OF THE PREFERRED EMBODIMENTS

Figure 1:
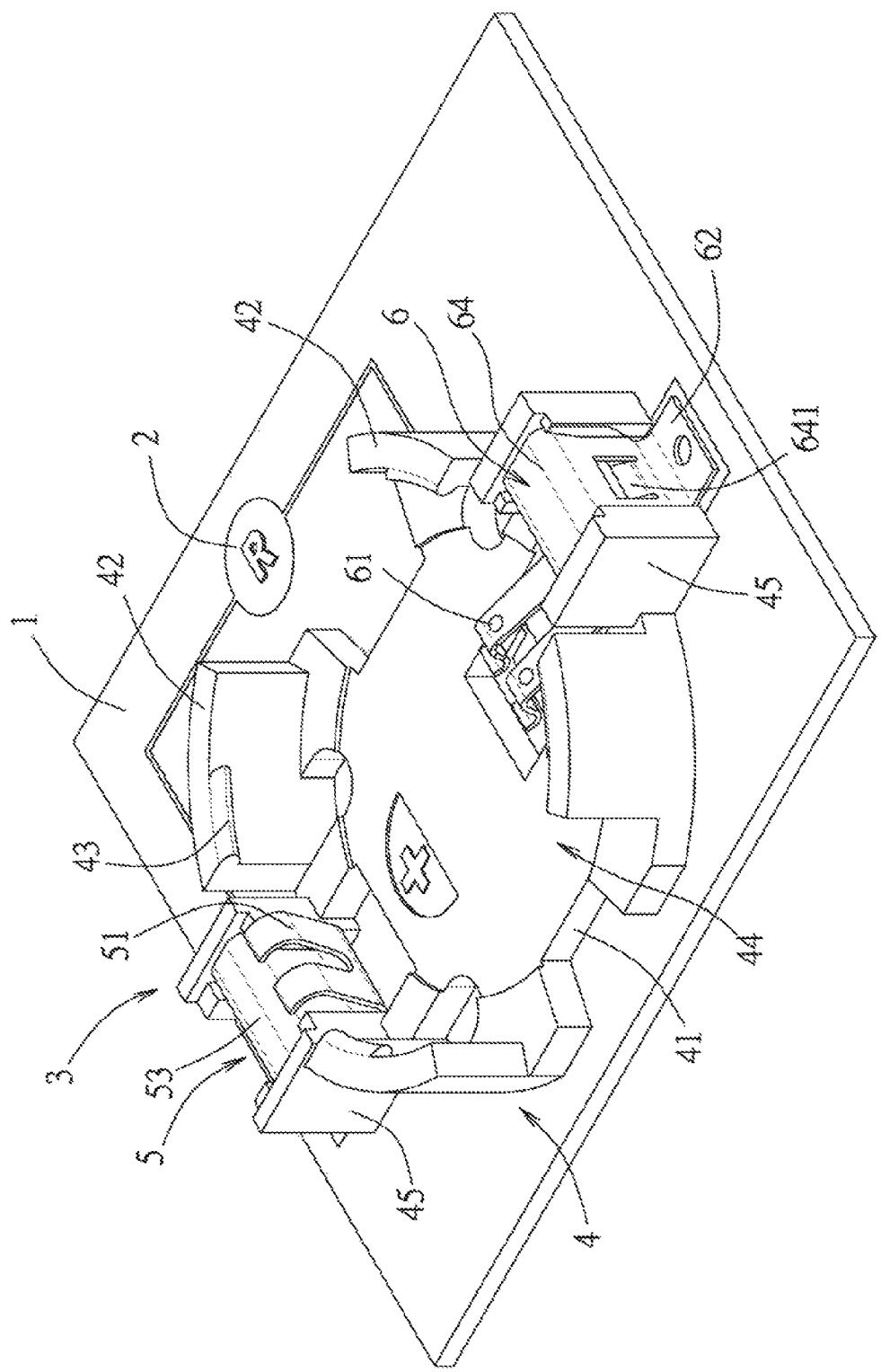
FIG. 1 is a perspective view illustrating an embodiment of a circuit module of the present disclosure.
Figure 2:
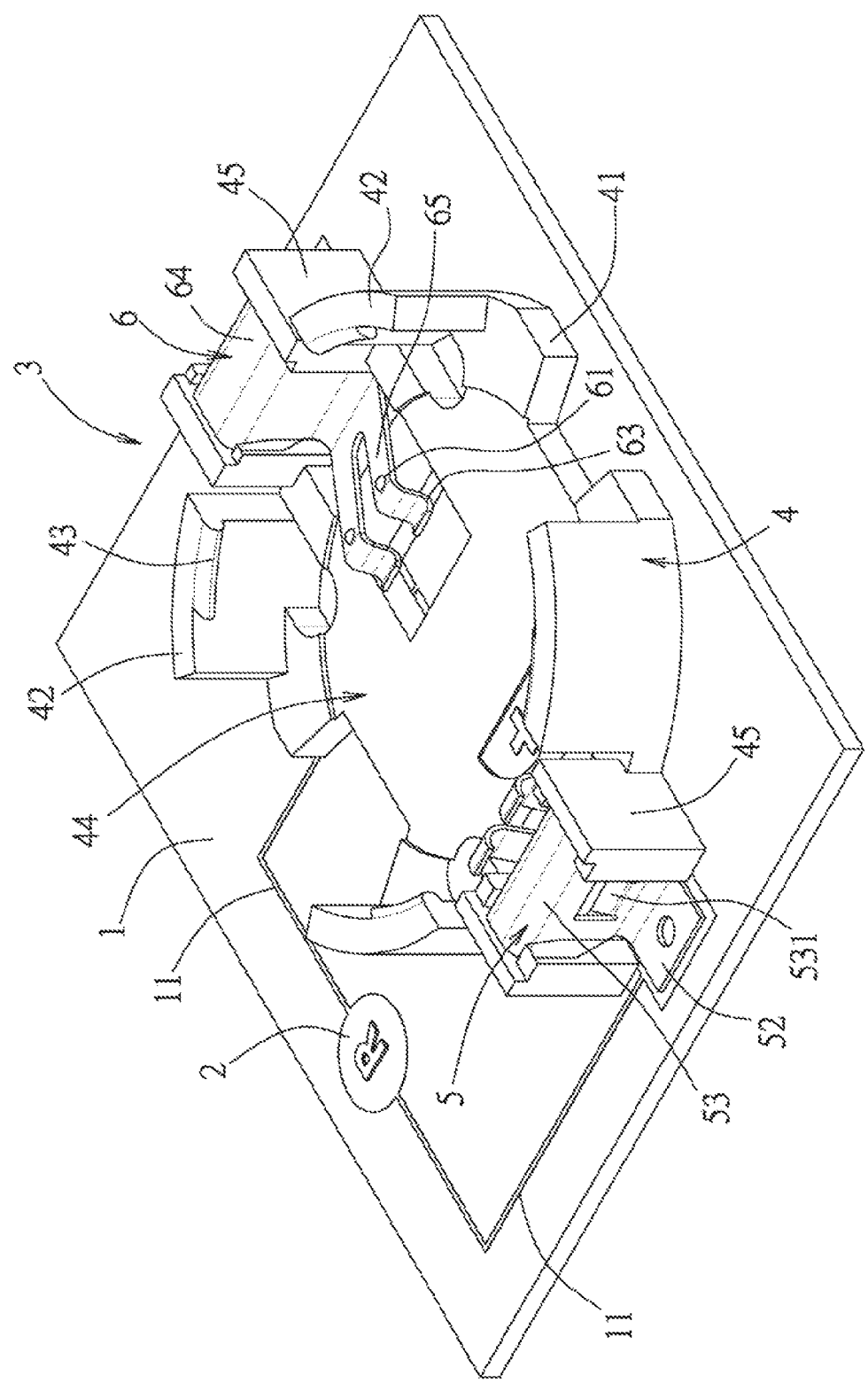
FIG. 2 is a perspective view of the embodiment viewed from another angle.
Figure 3:
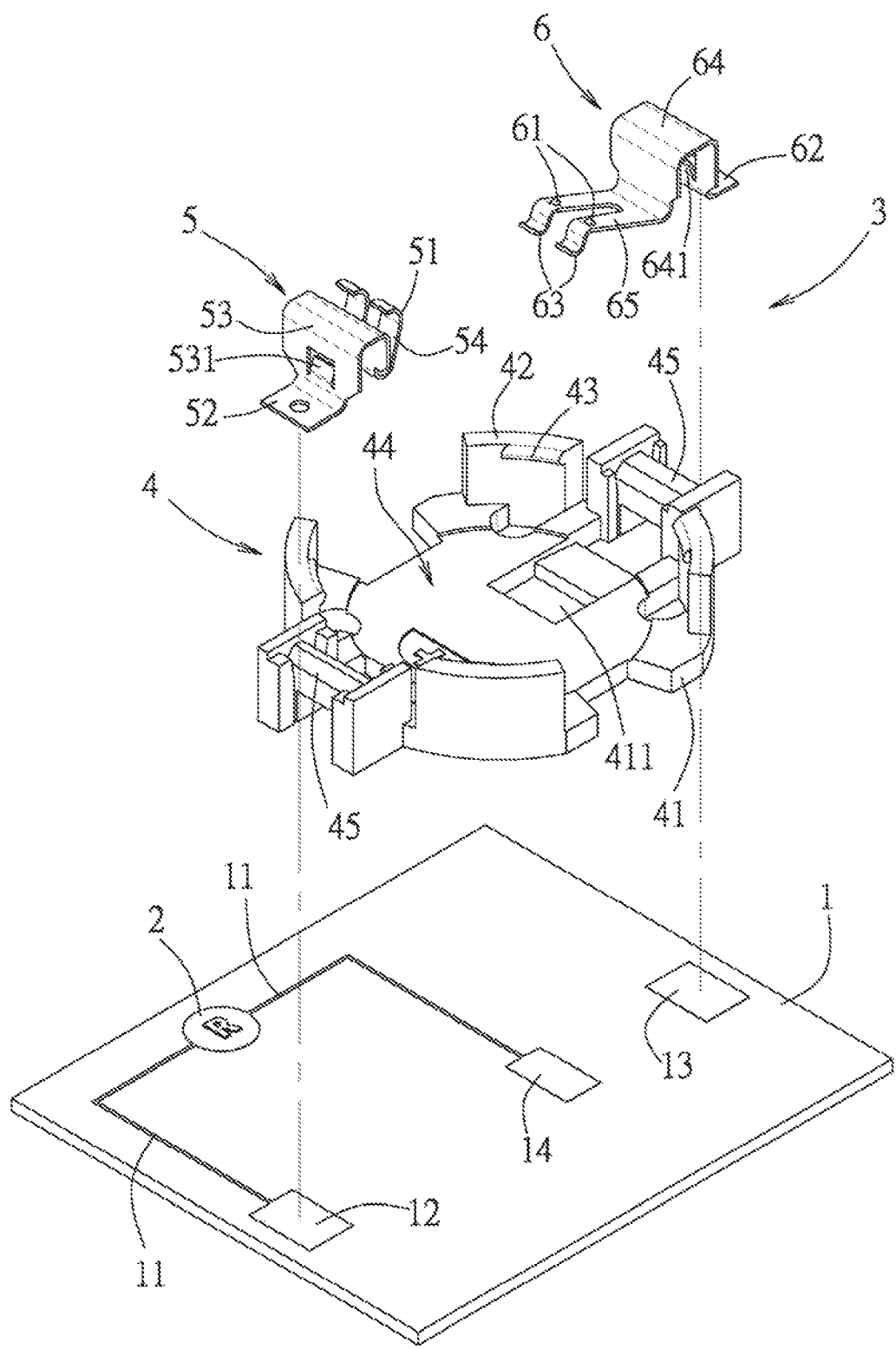
FIG. 3 is an exploded perspective view of the embodiment.
Figure 4:
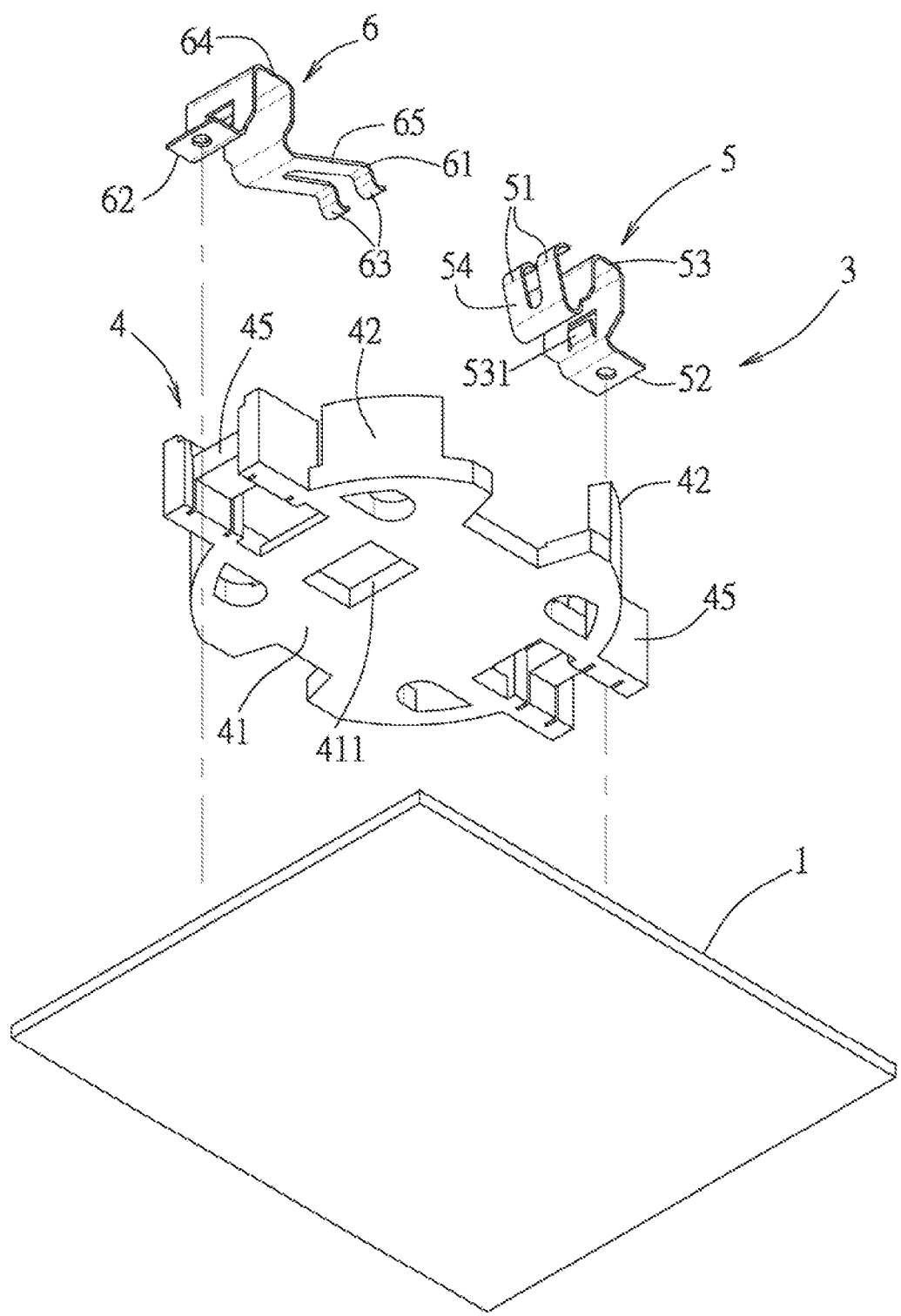
FIG. 4 is an exploded perspective view of the embodiment viewed from another angle.

Referring to FIG. 1 to FIG. 4, FIG. 7 and FIG. 8, a circuit module of an embodiment of the present disclosure comprises a circuit board 1, an indicating member 2 and a battery connector 3. The circuit board 1 is provided with a first conductive portion 12, a second conductive portion 13 and a third conductive portion 14. The indicating member 2 is electrically connected between the first conductive portion 12 and the third conductive portion 14 of the circuit board 1.

The battery connector 3 is provided on the circuit board 1 so as to electrically connect a button battery 7, and the battery connector 3 comprises an insulating housing 4, a positive terminal 5 and a negative terminal 6.

The insulating housing 4 comprises a bottom wall 41, a plurality of elastic side walls 42 which respectively connect with the bottom wall 41 and a plurality of protruding blocks 43, each protruding block 43 protrudes from the corresponding elastic side wall 42 at a position close to the top of the corresponding elastic side wall 42, is spaced apart from the bottom wall 41 and faces the bottom wall 41. The bottom wall 41, the plurality of elastic side walls 42 and the plurality of protruding blocks 43 cooperate with each other to define a limiting space 44 for receiving and fixing the button battery 7. The positive terminal 5 is fixed to the insulating housing 4, and comprises a positive contact portion 51 which extends into the limiting space 44 so as to contact a positive electrode on a side surface of the button battery 7 and a first tail portion 52 which extends out of the insulating housing 4 and maintains an electrical connection with the first conductive portion 12 of the circuit board 1. The negative terminal 6 is fixed to the insulating housing 4, and comprises a negative contact portion 61 which extends into the limiting space 44 so as to contact a negative electrode on a bottom surface of the button battery 7, a second tail portion 62 which extends out of the insulating housing 4 and maintains an electrical connection with the second conductive portion 13 of the circuit board 1, and a connection portion 63 which is brought to move by the negative contact portion 61 so as to electrically connect with the third conductive portion 14 of the circuit board 1 when the button battery 7 is received in the limiting space 44. In the embodiment, when the button battery 7 is received in the limiting space 44, a top surface of the button battery 7 abuts against the plurality of protruding blocks 43, and the connection portion 63 contacts and electrically connects with the third conductive portion 14 of the circuit board 1, that is, it is ensured that the connection portion 63 and the third conductive portion 14 of the circuit board 1 establish an electrical connection when the button battery 7 is received in the limiting space 44. Moreover, in the embodiment, the first tail portion 52 and the second tail portion 62 electrically connect with and maintain electrical connection with the first conductive portion 12 and the second conductive portion 13 of the circuit board 1 by surface mount technology (SMT) respectively, moreover, the first conductive portion 12, the second conductive portion 13 and the third conductive portion 14 each are a conductive pad, but the first tail portion 52 and the second tail portion 62 may adjust a connection manner with the circuit board 1 according to the use requirement, and the first conductive portion 12 and the second conductive portion 13 may also correspondingly adjust, for example, when the first tail portion 52 and the second tail portion 62 each are a pin, the first conductive portion 12 and the second conductive portion 13 each correspondingly are a via.

In the embodiment, the insulating housing 4 further comprises two mounting portions 45 which respectively connect with the bottom wall 41, are spaced apart from each other and face each other, the positive terminal 5 and the negative terminal 6 are fixed on the two mounting portions 45 respectively. The bottom wall 41 of the insulating housing 4 has a through groove 411 which corresponds to the connection portion 63 of the negative terminal 6 in position for providing a space for the connection portion 63 of the negative terminal 6 to move and contact the third conductive portion 14 of the circuit board 1 so as to establish an electrical connection. The negative terminal 6 further comprises a fixed portion 64 which is provided on the corresponding mounting portion 45 and an elastic arm 65 which extends from an end of the fixed portion 64 adjacent to the limiting space 44. The second tail portion 62 extends from an end of the fixed portion 64 outside the limiting space 44, the connection portion 63 is formed at a distal end of the elastic arm 65 and faces toward the through groove 411, that is, the second tail portion 62 and the connection portion 63 of the negative terminal 6 are positioned respectively at two opposite ends. The negative contact portion 61 is formed on the elastic arm 65, is adjacent to the connection portion 63 and faces toward the limiting space 44. The positive terminal 5 further comprises a fixed portion 53 which is provided on the corresponding mounting portion 45 and an elastic arm 54 which extends upwardly from an end of the fixed portion 53 adjacent to the limiting space 44, the first tail portion 52 extends from an end of the fixed portion 53 outside the limiting space 44, the positive contact portion 51 is formed on the elastic arm 54 and faces toward the limiting space 44. In the embodiment, the fixed portion 53 of the positive terminal 5 and the fixed portion 64 of the negative terminal 6 each are an inverted U-shape and respectively provided with a latch tab 531 and a latch tab 641 at an opposite side of the limiting space 44 to respectively latch with the corresponding mounting portions 45.

Figure 5:
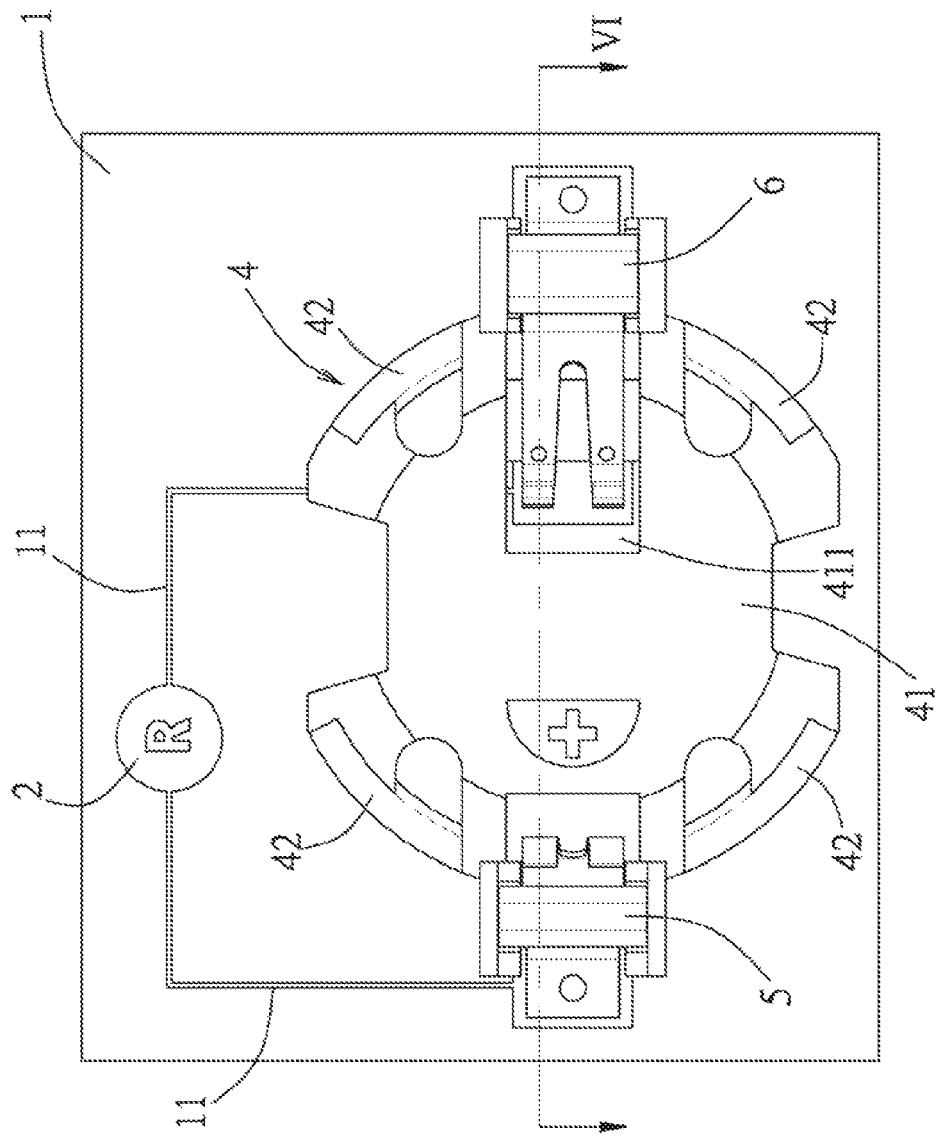
FIG. 5 is a top view of the embodiment.
Figure 6:
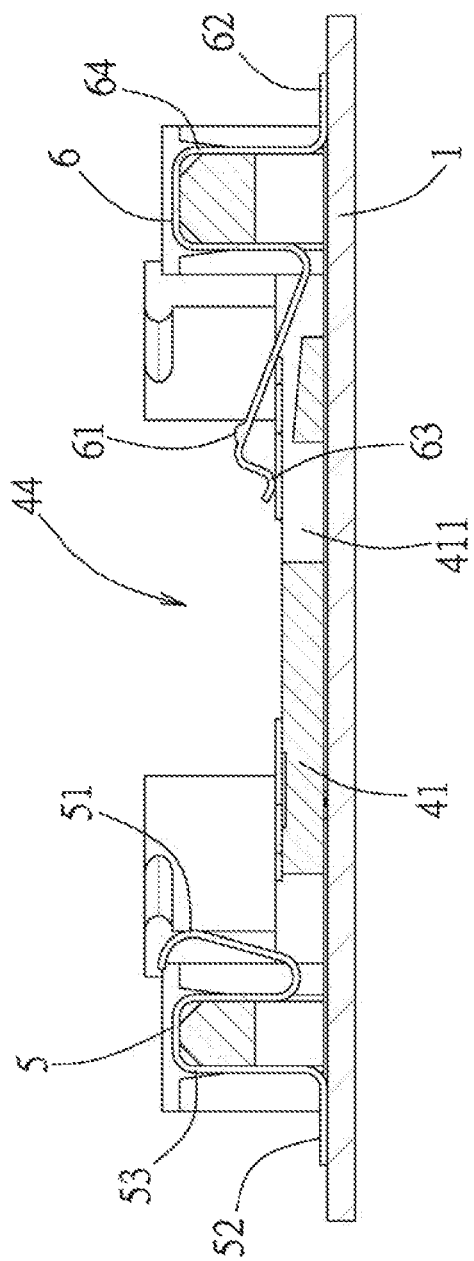
FIG. 6 is a sectional view taken along a line VI-VI of FIG. 5.
Figure 7:
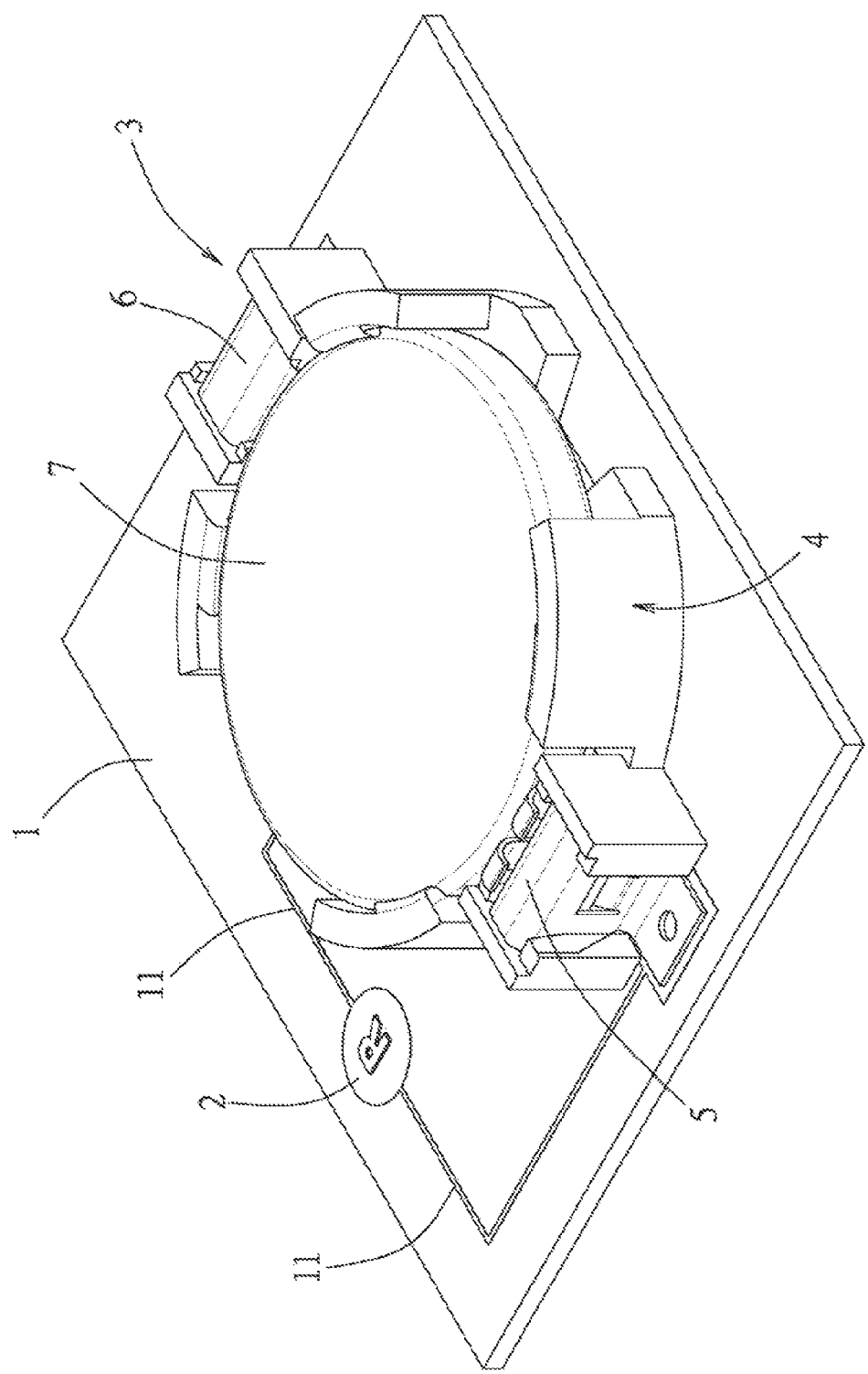
FIG. 7 is a perspective view illustrating a state that a button battery is placed in the embodiment.
Figure 8:
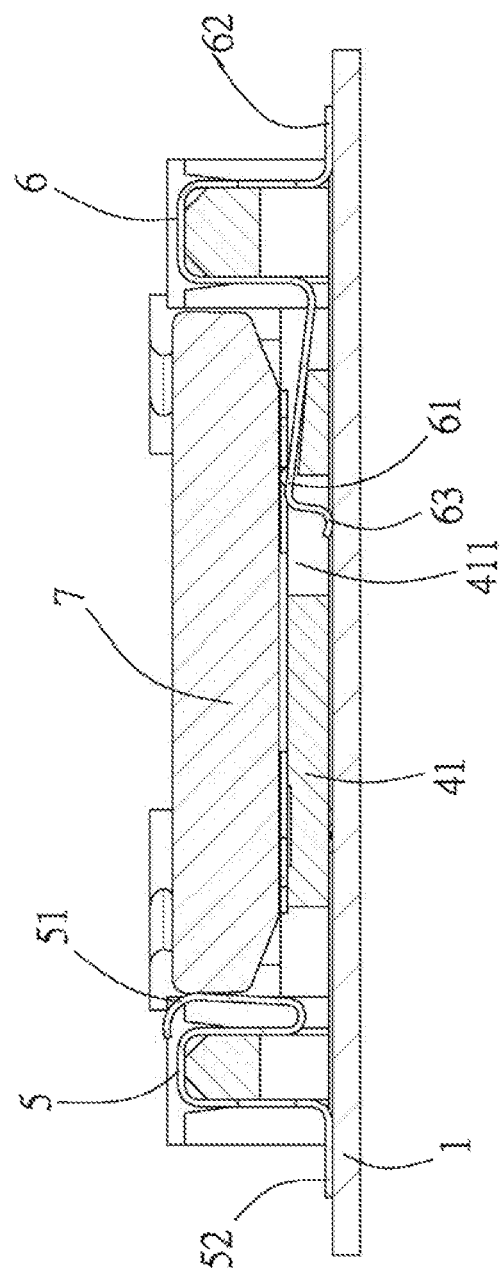
FIG. 8 is a view similar to FIG. 6 and illustrating the state that the button battery is mounted in the embodiment.

Referring to FIG. 5 and FIG. 6, when the button battery 7 is not mounted on the battery connector 3, the connection portion 63 of the negative terminal 6 is spaced apart from the circuit board 1 by a certain distance and does not contact the circuit board 1. Again referring to FIG. 7 and FIG. 8, when the button battery 7 is mounted on the limiting space 44 and reaches a predetermined position, that is, the button battery 7 fully enters into the limiting space 44 and the top surface of the button battery 7 abuts against the plurality of protruding blocks 43, and the button battery 7 can be held by the plurality of elastic side walls 42 and the plurality of protruding blocks 43, at this time, the positive contact portion 51 of the positive terminal 5 contacts the positive electrode on the side surface of the button battery 7 to establish an electrical connection, the negative contact portion 61 of the negative terminal 6 contacts the negative electrode on the bottom surface of the button battery 7 to establish an electrical connection, and the negative contact portion 61 is pressed down by the button battery 7 to move downwardly, the connection portion 63 is brought to move by the negative contact portion 61 to also move downwardly and in turn to contact the third conductive portion 14 of the circuit board 1 to establish an electrical connection, so that the indicating member 2 is electrified to generate an indication signal. In other words, when the button battery 7 is received in the limiting space 44, the connection portion 63 electrically connects with the third conductive portion 14 to electrify the indicating member 2 to generate the indication signal. That is, when the button battery 7 is received in the limiting space 44, an operative circuit of the button battery 7 and an operative circuit of the indicating member 2 are electrified at the same time. The indicating member 2 may be a light emitting member, such as a light-emitting member (for example LED, bulb), a screen display element (for example liquid crystal display) and the like which can generate for example an optical signal, display character or symbol after electrified. In the embodiment, the indicating member 2 electrically connects with the first conductive portion 12 and the third conductive portion 14 via two conductive wires 11 respectively, the conductive wire 11 may be a trace or a conductive wire directly provided on the circuit board 1. When the button battery 7 is not placed in the limiting space 44 or does not reach the predetermined position, the connection portion 63 of the negative terminal 6 does not contact the third conductive portion 14 of the circuit board 1, so that the operative circuit of the indicating member 2 is interrupted; when the button battery 7 is placed in the limiting space 44 and reaches the predetermined position, the connection portion 63 of the negative terminal 6 contacts the third conductive portion 14 of the circuit board 1 to establish an electrical connection, so that the operative circuit of the indicating member 2 is electrified and the indicating member 2 generates an indication signal. If the button battery 7 does not reach the predetermined position when mounted, the indicating member 2 does not generate any indication signal, which can remind a user that the button battery 7 is not placed to reach a predetermined position. In this way, whether the button battery 7 is mounted to reach the predetermined position or not can be detected and provided for a user for identification, so that it avoids the button battery 7 not being mounted to reach the predetermined position to produce the risk of poor electrical contact or electrical interruption. Moreover, when the button battery 7 is received in the limiting space 44, the negative contact portion 61 of the negative terminal 6 can obtain support by that the connection portion 63 abuts against the circuit board 1 to make a normal force of the negative contact portion 61 contacting the button battery 7 increased, and in turn the contact stability can be maintained, that is, the button battery 7 electrically connects with the negative terminal 6 stably.

In conclusion, when the button battery 7 is received in the limiting space 44, the connection portion 63 of the negative terminal 6 electrically connects with the third conductive portion 14 of the circuit board 1 to electrify the indicating member 2 and in turn the indicating member 2 generates an indication signal, so that whether the button battery 7 is mounted to reach the predetermined position or not can be detected and provided for a user for identification, so that it avoids the button battery 7 not being mounted to reach the predetermined position to produce the risk of poor electrical contact or electrical interruption. And, when the button battery 7 is received in the limiting space 44, the negative contact portion 61 of the negative terminal 6 can obtain support by that the connection portion 63 abuts against the circuit board 1 to make a normal force of the negative contact portion 61 contacting the button battery 7 increased, and in turn the contact stability can be maintained, that is, the button battery 7 electrically connects with the negative terminal 6 stably.

The above described contents are only the embodiments of the present disclosure, which cannot limit the scope of the implementation of the present disclosure, namely simple equivalent variations and modifications made according to the claims and the content of the present disclosure are still fallen within the scope of the present disclosure.

What is claimed is:
1. A battery connector, for being mounted on a circuit board to electrically connect a button battery, the circuit board being provided with a first conductive portion, a second conductive portion and a third conductive portion, and an indicating member being electrically connected between the first conductive portion and the third conductive portion, the battery connector comprising:
- an insulating housing comprising a bottom wall, a plurality of elastic side walls which respectively connect with the bottom wall and a plurality of protruding blocks, each protruding block protruding from the corresponding elastic side wall at a position adjacent to the top of the corresponding elastic side wall, being spaced apart from the bottom wall and facing the bottom wall, the bottom wall, the plurality of elastic side walls and the plurality of protruding blocks cooperating with each other to define a limiting space for receiving and fixing the button battery;
- a positive terminal fixed to the insulating housing, the positive terminal comprising a positive contact portion which extends into the limiting space so as to contact a positive electrode on a side surface of the button battery and a first tail portion which extends out of the insulating housing so as to maintain an electrical connection with the first conductive portion of the circuit board; and
- a negative terminal fixed to the insulating housing, the negative terminal comprising a negative contact portion which extends into the limiting space so as to contact a negative electrode on a bottom surface of the button battery, a second tail portion which extends out of the insulating housing so as to maintain an electrical connection with the second conductive portion of the circuit board and a connection portion which is brought to move by the negative contact portion so as to electrically connect with the third conductive portion when the button battery is received in the limiting space, the indicating member being electrified to generate an indication signal by that the connection portion electrically connects with the third conductive portion.

2. The battery connector according to claim 1, wherein when the button battery is received in the limiting space, a top surface of the button battery abuts against the plurality of protruding blocks and the connection portion contacts and electrically connects with the circuit board.

3. The battery connector according to claim 1, wherein the second tail portion and the connection portion of the negative terminal are positioned at two opposite ends respectively.

4. The battery connector according to claim 1, wherein the insulating housing further comprises two mounting portions which respectively connect with the bottom wall, are spaced apart from each other and face each other, and the positive terminal and the negative terminal are fixed on the two mounting portions respectively.

5. The battery connector according to claim 1, wherein the bottom wall of the insulating housing has a through groove which corresponds to the connection portion of the negative terminal in position for providing a space for the connection portion of the negative terminal to move and contact the third conductive portion of the circuit board so as to establish an electrical connection.

6. The battery connector according to claim 5, wherein the negative terminal further comprises a fixed portion which is provided on the corresponding mounting portion and an elastic arm which extends from an end of the fixed portion adjacent to the limiting space, the second tail portion extends from an end of the fixed portion outside the limiting space, the connection portion is formed at a distal end of the elastic arm and faces toward the through groove, the negative contact portion is formed on the elastic arm, is adjacent to the connection portion and faces toward the limiting space.

7. A circuit module, comprising:
- a circuit board provided with a first conductive portion, a second conductive portion and a third conductive portion;
- an indicating member electrically connected between the first conductive portion and the third conductive portion of the circuit board; and
- a battery connector mounted on the circuit board to electrically connect a button battery, and comprising:
    - an insulating housing comprising a bottom wall, a plurality of elastic side walls which respectively connect with the bottom wall and a plurality of protruding blocks, each protruding block protruding from the corresponding elastic side wall at a position adjacent to the top of the corresponding elastic side wall, being spaced apart from the bottom wall and facing the bottom wall, the bottom wall, the plurality of elastic side walls and the plurality of protruding blocks cooperating with each other to define a limiting space for receiving and fixing the button battery;
    - a positive terminal fixed to the insulating housing, the positive terminal comprising a positive contact portion which extends into the limiting space so as to contact a positive electrode on a side surface of the button battery and a first tail portion which extends out of the insulating housing so as to maintain an electrical connection with the first conductive portion of the circuit board; and
    - a negative terminal fixed to the insulating housing, the negative terminal comprising a negative contact portion which extends into the limiting space so as to contact a negative electrode on a bottom surface of the button battery, a second tail portion which extends out of the insulating housing so as to maintain an electrical connection with the second conductive portion of the circuit board and a connection portion which is brought to move by the negative contact portion so as to electrically connect with the third conductive portion when the button battery is received in the limiting space, the indicating member being electrified to generate an indication signal by that the connection portion electrically connects with the third conductive portion.

8. The circuit module according to claim 7, wherein when the button battery is received in the limiting space, a top surface of the button battery abuts against the plurality of protruding blocks and the connection portion contacts and electrically connects with the circuit board.

9. The circuit module according to claim 7, wherein the second tail portion and the connection portion of the negative terminal are positioned at two opposite ends respectively.

10. The circuit module according to claim 9, wherein the insulating housing further comprises two mounting portions which respectively connect with the bottom wall, are spaced apart from each other and face each other, and the positive terminal and the negative terminal are fixed on the two mounting portions respectively.

11. The circuit module according to claim 7, wherein the bottom wall of the insulating housing has a through groove which corresponds to the connection portion of the negative terminal in position for providing a space for the connection portion of the negative terminal to move and contact the third conductive portion of the circuit board so as to establish an electrical connection.

12. The circuit module according to claim 11, wherein the negative terminal further comprises a fixed portion which is provided on the corresponding mounting portion and an elastic arm which extends from an end of the fixed portion adjacent to the limiting space, the second tail portion extends from an end of the fixed portion outside the limiting space, the connection portion is formed at a distal end of the elastic arm and faces toward the through groove, the negative contact portion is formed on the elastic arm, is adjacent to the connection portion and faces toward the limiting space.

13. The circuit module according to claim 7, wherein the indicating member is a light emitting member.

14. The circuit module according to claim 7, wherein the indicating member is a screen display element.

15. The circuit module according to claim 7, wherein the indicating component electrically connects with the first conductive portion and the third conductive portion via two conductive wires respectively.

* * * * *